Sept. 2, 1952 — E. C. STANTON — 2,609,044
TOASTER
Filed June 17, 1949 — 2 SHEETS—SHEET 1

INVENTOR
EDWARD C. STANTON
BY J. H. Braddock
ATTORNEY

Sept. 2, 1952  E. C. STANTON  2,609,044
TOASTER
Filed June 17, 1949  2 SHEETS—SHEET 2
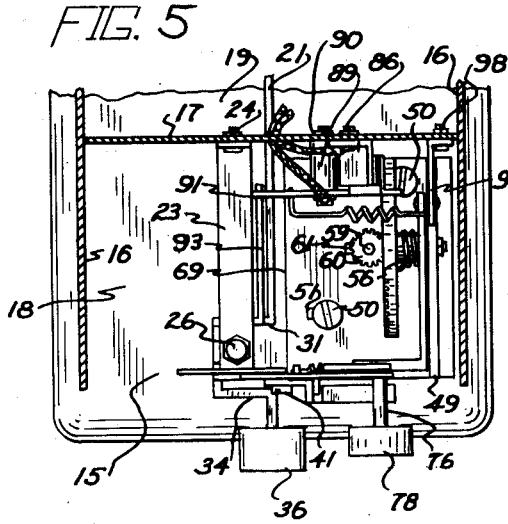
FIG. 5
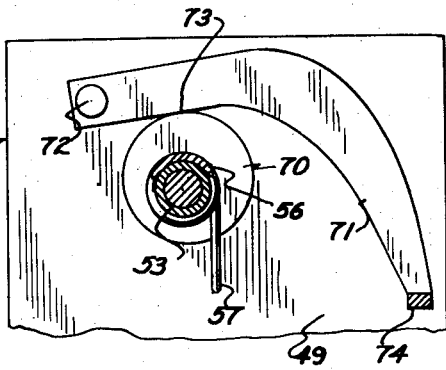
FIG. 6
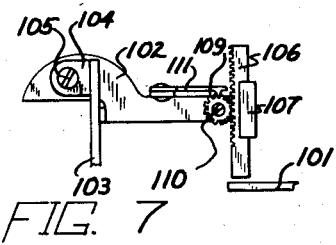
FIG. 7
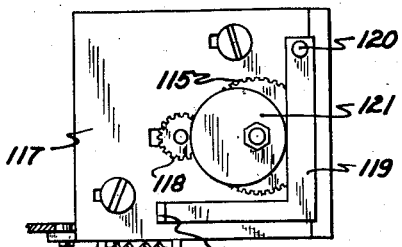
FIG. 9
FIG. 8
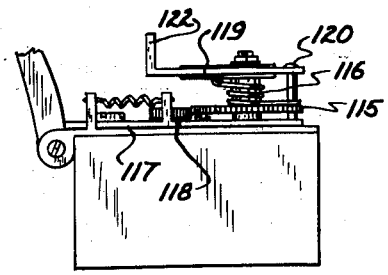
FIG. 10
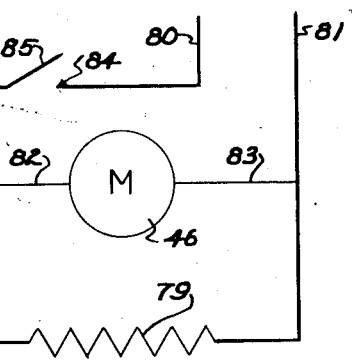
FIG. 11
INVENTOR
EDWARD C. STANTON
BY
*G. H. Braddock*
ATTORNEY Patented Sept. 2, 1952

2,609,044

UNITED STATES PATENT OFFICE 2,609,044

TOASTER

Edward C. Stanton, Robbinsdale, Minn.

Application June 17, 1949, Serial No. 99,801

7 Claims. (Cl. 161—1)

The invention herein presents an electric motor operated device for toasting bread, etc., and the object of the invention is to provide a toaster wherein will be incorporated various desirable, novel and improved features and characteristics of construction.

In the accompanying drawings forming a part of this specification,

Fig. 5 is a fragmentary horizontal transverse sectional view, taken on line 5—5 in Fig. 2;

Fig. 6 is a detail sectional view, taken on line 6—6 in Fig. 3;

Fig. 7 is an elevational view detailing a modified type of instrumentality which can be employed to set the toaster selectively to produce light, medium or dark toast;

Fig. 8 is an edge view of the disclosure of Fig. 7 as it would appear from the top of the sheet;

Fig. 9 is a plan view of mechanism which can be employed in the toaster as a substitute for equivalent mechanism disclosed in Figs. 2 to 5;

Fig. 10 is a side elevational view of the disclosure of Fig. 9; and

Fig. 11 is a diagrammatic view of an electrical system of the toaster.

Figure 1:
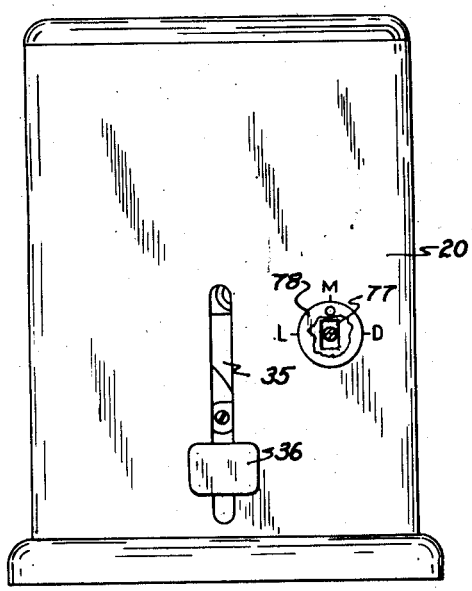
Fig. 1 is an end elevational view of a toaster made according to the invention.

With respect to Figs. 1 to 6 of the drawings and the numerals of reference thereon, 15 denotes a horizontal base wall, 16, 16 represent spaced apart, parallel, vertical, longitudinally extending side walls and 17 indicates a vertical transversely extending intermediate wall of the toaster. The side walls 16, 16 and the transverse wall 17 are suitably and conveniently supported upon the base wall 15, and said transverse wall spans the distance between said side walls. The transverse wall 17 and the side walls 16, 16 together define a first compartment 18 disposed exteriorly of said transverse wall bounded at its bottom by the base wall 15, and said transverse and side walls together define a second compartment 19 disposed interiorly of the transverse wall also bounded at its bottom by said base wall. The first compartment 18 contains operative mechanism of the toaster, and a cover for the exterior end of said first compartment is designated 20. The second compartment 19 will contain a bread rack (not shown) adapted to be depressed in response to manual lowering, in a manner to be made clear, of a supporting arm 21 for the bread rack. There will be the customary vertical passageways, not necessary to be disclosed, leading downwardly through the second compartment 19 to the bread rack, said second compartment will be enclosed save for said vertical passageways, and, desirably, the upper end of the first compartment will be covered by a top wall, denoted 22, of the toaster frame.

A horizontal arm 23, secured at 24 to a portion of the transverse wall 17 in spaced relation to the base wall 15 and the side walls 16, 16, and extending exteriorly of said transverse wall 17 in parallel relation to said base wall and side walls, fixedly supports, as at 25, the upper end of a vertical guide post 26 the lower end of which is fixedly supported, as at 27, in the base wall 15 in adjacent relation to the cover 20.

An elongated actuator bar 28 includes flange portions, indicated 29 and 30, respectively, upon its opposite ends slidably mounted upon the vertical post 26 in a manner to retain the body of said elongated actuator bar in parallel relation to said vertical post. As shown, said body of the actuator bar is situated at the side of the horizontal arm 23 which is opposite the bread rack supporting arm 21. An end part of the body of said actuator bar adjacent the flange portion 30 integrally or rigidly supports an extension piece 31 extending transversely of and below said horizontal arm 23, and said extension piece in turn integrally or rigidly supports the bread rack supporting arm 21. Said supporting arm 21 is in spaced, parallel relation to the side walls 16, 16, as well as to the base wall 15, and extends through and is freely movable in a vertical elongated slot 32 in the transverse wall 17.

A compression coil spring 33 upon the vertical guide post 26, having one of its ends engaged against the base wall 15 and its other end engaged against the exterior surface of the flange portion 30, normally retains the actuator bar 28 at its uppermost position, which is limited by engagement of the supporting arm 21 with a surface of the transverse wall 17 bounding the upper end of the vertical slot 32, and an L-shape extension piece 34, upon a portion of said actuator bar adjacent said flange portion 30 and slidably movable in a vertical slot 35 in the cover 20, integrally or rigidly supports a finger piece 36, of rectilinear configuration as disclosed and situated exteriorly of the toaster frame, adapted to be manually lowered to cause the actuator bar and the supporting arm 21 carried thereby to be lowered against resilient action of the compression coil spring 33.

An upright 37, fixedly supported upon the base wall 15, as at 38, at the side of the vertical guide post 26 opposite the body of the actuator bar 28 and at the exterior side of the first compartment 18, integrally or rigidly includes a flange portion 39 disposed transversely of the toaster, and a latching lever 40 has an intermediate portion thereof pivotally mounted, as at 41, upon said flange portion 39 for swinging movement of the latching lever in a vertical plane. Said latching lever is in a vertical plane disposed transversely of the toaster and situated at the side of the vertical guide post 26 opposite the supporting arm 21. A shorter leg 42 of the latching lever 40, at the side of the pivotal support 41 adjacent said vertical guide post 26, constitutes a latching element of said latching lever adapted to be engaged back of a keeper 43 integral or rigid with an intermediate portion of the body of the elongated actuator element 28 when said actuator element is manually moved to depressed position, as in Fig. 2, and a longer leg 44 of said latching lever, at the side of said pivotal support 41 opposite said vertical guide post, integrally or rigidly supports a stop element 45 adapted to be engaged against the upright 37 to preclude upward movement of said keeper 43 past said latching element when the parts are disposed as in said Fig. 2. The latching lever is free to rotate in counterclockwise direction as shown in Figs. 2 and 3 to permit the keeper 43 to pass downwardly to position below the latching element 42 when the actuator bar 28 is manually depressed, and the longer leg 44, with appurtenances, of said latching lever is heavier than the shorter leg to move downwardly by gravity upon passage of the keeper to position below and clear of said shorter leg, thus to cause the latching lever to rotate clockwise and the latching element to be situated in position back of the keeper.

Figure 2:
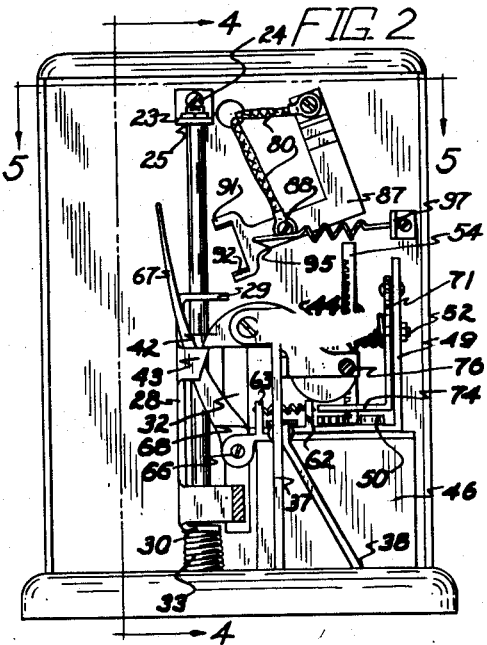
Fig. 2 is a view corresponding generally with the disclosure of Fig. 1, but with the end cover shown in said Fig. 1 removed.
Figure 4:
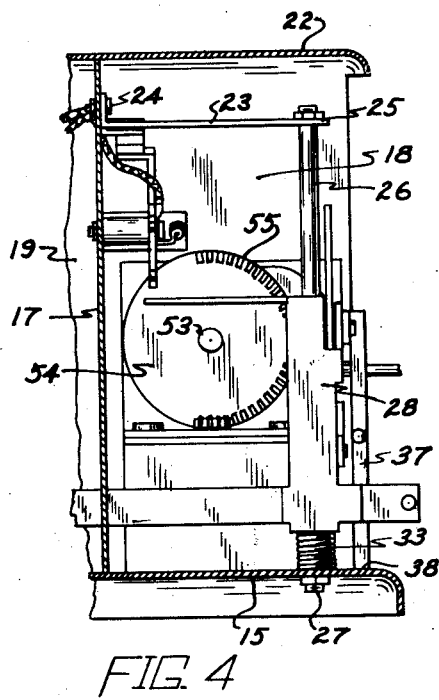
Fig. 4 is a fragmentary vertical longitudinal sectional view of the toaster, taken on line 4—4 in Fig. 2.
Figure 3:
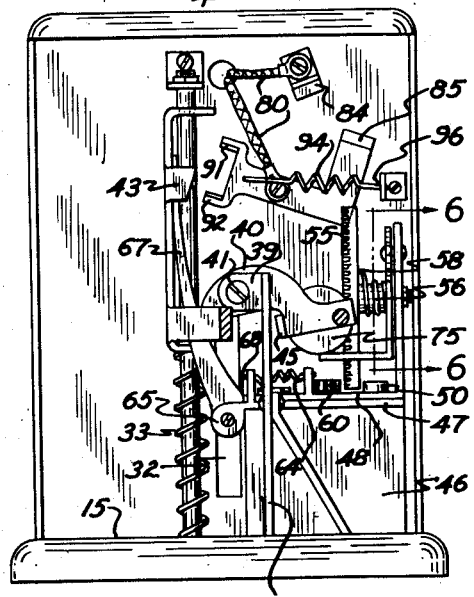
Fig. 3 is a view corresponding generally with the disclosure of Fig. 2 showing parts of the toaster in different positions.

The longer leg 44 of the latching lever 40 is adapted to be forcibly swung upwardly, in response to actuation of a time controlled releasing mechanism of the toaster, to cause the shorter leg or latching element 42 to be rotated downwardly, in counterclockwise direction, from its position in Fig. 2, thus first to cause the keeper 43, and hence the actuator bar 28, to be forcibly moved downwardly against the resilient action of the compression coil spring 33, and thereafter cause said shorter leg or latching element to be moved clear of the keeper. Said compression coil spring will react upon removal of the latching element from the keeper to cause the actuator bar 28, together with the bread rack supporting arm 21 as a unit, to be moved from the depressed position as in Fig. 2 to the elevated position as in Fig. 3.

The time controlled releasing mechanism is actuated by a synchronous motor 46 suitably and conveniently supported upon the base wall 15 of the toaster.

A horizontal plate 47 rigid with an upper surface of the motor 46 slidably supports a horizontal length 48 of an L-shape member, having an upwardly extending vertical length 49 disposed in spaced, perpendicular relation to the latching lever 40 adjacent its longer leg and opposite its shorter leg, for reciprocatory movement of the L-shape member toward and away from said latching lever and the vertical guide post 26. As disclosed in Figs. 2, 3, 4 and 5 of the drawings, the horizontal length 48 is situated beneath the latching lever 40 and the vertical length 49 is positioned in spaced relation to the free end of the longer leg 44 of said latching lever. Means for securing said horizontal length 48 upon the horizontal plate 47 and permitting the L-shape member to have reciprocatory movement toward and away from the actuator bar 28 is constituted as small screws 50 threaded into the horizontal plate 47 and situated in rectangular slots 51 in the horizontal length 48. The rectangular slots 51 preclude movement of said horizontal length longitudinally of the toaster and permit the horizontal length to move transversely of said toaster, and the heads of the small screws 50 preclude movement of said horizontal length away from said horizontal plate.

The vertical length 49 of the L-shape member rotatably supports, as at 52, against the possibility of longitudinal movement, a horizontal shaft 53 disposed interiorly of said vertical length in spaced, parallel relation to the horizontal length 48 and in perpendicular relation to the vertical length 49. A vertically disposed gear 54, fixed upon the inner end of the horizontal shaft 53, is disposed in spaced, parallel relation to the vertical length 49, as well as in spaced, parallel relation to the supporting arm 21, and said vertically disposed gear 54 includes equally spaced gear teeth 55 adjacent the circumference of its interior surface, or surface opposite said vertical length 49. A tension coil spring 56 on the horizontal shaft 53, between the vertical length 49 and the vertically disposed gear 54, has one of its ends secured, as at 57, to said vertical length 49 and its other end secured, as at 58, to said vertically disposed gear.

A vertical drive shaft 59 of the motor 46 rigidly supports a horizontally disposed pinion 60 disposed adjacent the periphery of the vertical gear 54 at the side thereof opposite the vertical length 49. Said drive shaft 59 extends upwardly from the motor through a rectilinear slot 61 in the horizontal length 48.

Said horizontal length of the L-shape member slidably mounted upon the horizontal plate 47 integrally or rigidly supports an upstanding lug 62, said horizontal plate 47 integrally or rigidly supports an upstanding lug 63, and a tension spring 64 connected between the lugs 62 and 63 is for urging said L-shape member inwardly of the frame of the toaster to cause the teeth on the vertically disposed gear 54 to be resiliently engaged with the pinion 60.

The horizontal plate 47 integrally or rigidly supports an ear 65, disposed at a side of the motor 46 opposite the vertical length 49 below the latching lever 40, which pivotally supports, as at 66, a gear and pinion releasing lever 67 for swinging movement in a vertical plane perpendicular to the plane of said vertical length 49. The releasing lever 67 extends upwardly from its pivotal support 66 and is disposed generally at the side of said pivotal support opposite the L-shape member. Also, said releasing lever 67 is of general curvilinear configuration, and its edge surface opposite the latching lever 40 is engaged, by reason of gravity, against the adjacent surface of the body of the elongated actuator bar 28. As will be clear from Figs. 2 to 5 of the drawings, while the releasing lever 67 rests against and is supported by the body of said elongated actuator bar, it is at a side of and out of vertical alinement with the flange portion 29. An inner end portion 68 of the edge surface of said releasing lever 67 opposite the edge surface rested against and supported by the elongated actuator bar is adapted to be clear of the free interior edge 69 of the horizontal length 48 of the L-shape member when the rack supporting arm 21 is in depressed position, as in Fig. 2, thus to permit the tension spring 64 to retain the vertically disposed gear 54 engaged with the horizontal pinion 60, and to be engaged against said free interior edge 69 when said rack supporting arm is in elevated position, as in Fig. 3, thus to retain said vertically disposed gear in spaced relation to said horizontal pinion against the resilient action of said tension spring 64. More explicitly stated, the actuator bar 28 is manually depressed, moved from position as in Fig. 3 to position as in Fig. 2, when the toaster is to be placed in operation. In said Fig. 2 the releasing lever 67 is rested by gravity against the body of said actuator bar, its inner end portion 68 is in spaced relation to the free interior edge 69 of the horizontal length 48 of the L-shape member, and the tension coil spring 64 is operative to resiliently retain the vertically disposed gear 54 in engaged relation with the horizontal pinion 60. The compression coil spring 33 is operative upon release of the keeper 43 from the latching element 42 to elevate the actuator bar, move it from position as in Fig. 2 to position as in Fig. 3. The releasing lever 67 is swung in direction toward the L-shape plate, from left toward right in Figs. 2 and 3, in response to upward movement of said actuator bar, accomplished by said compression coil spring 33, to cause said inner end portion 68 to engage said free interior edge 69 and cause said vertically disposed gear to be removed from said horizontal pinion. Evidently, the releasing lever 67 will move by gravity from its position as in Fig. 3 to its position as in Fig. 2 each time the actuator bar is depressed, thus to cause the inner end portion 68 to be removed from the free interior edge 69.

The horizontal shaft 53 fixedly supports a cam 70, disposed adjacent the vertical length 49 of the L-shape member, between said vertical length and the tension coil spring 56. A latch releasing lever 71, of curvilinear configuration as shown, has its upper, inner end pivotally supported, as at 72, upon the vertical length 49, a part 73 of the midlength of a lower edge surface of said releasing lever 71 adjacent the pivotal support 72 is ridable upon the cam 70, and the lower, outer end of the releasing lever 71 integrally or rigidly supports an actuator arm 74 disposed in perpendicular relation to the body of said releasing lever 71 and having its free end portion situated beneath the longer leg 44 of the latching lever 40. The latching lever 40 is adapted to be actuated in response to operation of the latch releasing lever 71, in a manner to be described, to cause the latching element 42 to be released from the keeper 43. Speaking generally, said latch releasing lever 71, together with the actuator arm 74 as a unit, is forcibly swung upwardly in response to rotational movement of the cam 70, accomplished by rotation of the vertically disposed gear 54 and the horizontal shaft 53, to cause said actuator arm to swing the longer leg 44 of the latching lever 40 upwardly, thus to accomplish release of the keeper 43.

The actuator arm 74 could become engaged directly against said longer leg 44 of said latching lever 40, and cause it to be swung upwardly and the latching element 42 to be swung downwardly to release the keeper 43. In the disclosure as made, however, the free end of said longer leg 44 adjustably supports an eccentrically mounted cylindrical piece 75 adapted to be engaged by said actuator arm when this operates to release the latch. The reason for including the eccentrically mounted piece 75 is that it provides readily adjustable means through the instrumentality of which light, medium and dark toast selectively can be produced by the device. The piece 75 is fixedly supported upon a horizontal shank 76 itself mounted in the longer leg 44. The construction and arrangement will be such that the horizontal shank 76 can be manually rotated in said longer leg 44 when this is desired, and also such that said horizontal shank will be frictionally retained at any position to which rotatably adjusted. The horizontal shank 76 passes freely through a vertical slot 77 in the cover 20, and a knob 78, fixed upon the outer end of said horizontal shank and situated externally of the toaster frame, is for accomplishing rotational adjustment of the horizontal shank, and hence of the eccentrically mounted piece 75. When light toast is desired, the knob 78 will be positioned so that a mark thereon is alined with the letter L on the cover 20 in Fig. 1 and said piece 75 is situated at a lower operative position. When dark toast is desired, said knob will be positioned so that the mark thereon is alined with the letter D on said cover and the piece 75 is situated at an upper operative position. When medium toast is desired, the knob will be positioned so that the mark thereon is alined with the letter M on said cover and said piece 75 is situated at an intermediate operative position. And, too, in practical operation of the toaster, the knob 78 can be manually rotated, in counterclockwise direction in Fig. 2, to be moved downwardly against the actuator arm 74 to extent to cause the longer leg 44 of the latching lever 40 to be forced upwardly a sufficient distance to cause the latching element 42 to be released from the keeper 43. That is to say, if it is desired to render the toaster inoperative, after made operative in response to depression of the actuator bar 28, before said toaster normally would be rendered inoperative by the time controlled mechanism, this can be accomplished merely by rotating the eccentrically mounted piece 75 in downward direction to extent causing the latching lever to be rotated, in counterclockwise direction in Fig. 2, to sufficient extent to release the keeper 43.

A heater for the toaster, which will be situated in contiguous relation to the second compartment 19, is constituted as a resistance element 79, disclosed in Fig. 11. Incoming wires from a suitable source (not shown) of electrical energy to the heater or resistance element 79 are denoted 80 and 81, respectively, the motor 46 is connected across said incoming wires by lead wires 82 and 83, and an electric switch along the incoming wire 80 includes a fixed contact element 84 and a movable contact element 85.

The fixed contact element 84 is insulatively supported, as at 86, upon an upper portion of the transverse wall 17 above the motor 46, etc., and the movable contact element 85 is situated between said fixed contact element and said motor 46, etc. More explicitly stated, a switch lever 87 has an intermediate portion thereof rotatably and insulatively supported, as at 88, upon a horizontal element 89 for swinging movement in a vertical plane. Said horizonal element 89 is fixedly supported, as at 90, upon the transverse wall 17. A leg of the switch lever 87 at a side of the rotatable support 88 adjacent the fixed contact element 84 integrally or rigidly supports the movable contact element 85, and the construction and arrangement are such that said fixed and movable contact elements will become engaged in response to rotation of said switch lever 87 in counterclockwise direction in Figs. 2 and 3 and disengaged in response to rotation of the switch lever in clockwise direction. A leg of said switch lever at the side of said rotatable support opposite the movable contact element 85 integrally supports spaced apart, upper and lower fingers 91 and 92 extending away from the rotatable support and disposed in a single vertical plane.

The flange portion 29 of the elongated actuator bar 28 integrally supports a horizontal actuator strip 93 disposed above and in parallel relation to the rack supporting arm 21, and a free end portion of said actuator strip is disposed in vertical alinement with the fingers 91 and 92. The construction and arrangement will be such that when said actuator bar 28 is depressed, moved from its position as in Fig. 3 to its position as in Fig. 2, the actuator strip will strike the lower finger 92 and cause the switch lever 87 to be rotated in counterclockwise direction, and when the actuator bar is elevated, moved from its position as in Fig. 2 to its position as in Fig. 3, said actuator strip will strike the upper finger 91 and cause said switch lever to be rotated in clockwise direction.

A tension spring 94, having one of its ends secured, as at 95, to the leg of the switch lever 87 having the fingers 91 and 92 and its other end secured, as at 96, to a horizontal strip 97 itself secured, as at 98, to the transverse wall 17, is for actuating said switch lever to cause the movable contact element 85 to engage the fixed contact element 84 when the switch lever is swung in counterclockwise direction beyond a dead center position and to be retained engaged with said fixed contact element, and also to cause said movable contact element to be moved to its wide open position, as in Fig. 3, when said switch lever is swung in clockwise direction beyond said dead center position and to be retained in said wide open position. That is, the actuator strip 93 is adapted to strike the lower finger 92 when the actuator bar 28 is manually depressed to cause the switch lever 87 to be swung beyond dead center position, counterclockwise in Figs. 2 and 3, so the tension spring 94 can complete the closing of the electric switch, and said actuator strip is adapted to strike the upper finger 91 when said actuator bar is elevated to cause said switch lever to be swung beyond dead center position, clockwise in said Figs. 2 and 3, so said tension spring 94 can complete the opening of said electric switch.

Supposing the operative parts of the device to be relatively situated as in Fig. 3 of the drawings and the actuator bar 28 and the rack supporting arm 21 to be depressed, in response to manual lowering of the finger piece 36, to extent sufficient to cause the keeper 43 to become engaged back of the latching element 42, as in Fig. 2, the gear and pinion releasing lever 67 will be removed from the horizontal length 48 of the L-shape member thus to permit the tension spring 64 to act to cause said gear to engage said pinion. Simultaneously, the switch 84—85 will become closed thus to cause the circuits including the motor 46 and the resistance element 79 to become made and said motor and resistance element to be energized. After the keeper 43 becomes engaged back of the latching element 42 it can be released therefrom only in response to actuation of the time controlled mechanism, or by manual manipulation of the eccentrically mounted piece 75 in the manner as hereinbefore set forth.

The motor 46 will start operation immediately when energized to cause the pinion 60 to be rotated. In turn said pinion will cause the gear 54 and the horizontal shaft 53 to be rotated in direction to wind the tension coil spring 56 upon said horizontal shaft thus to place said coil spring under tension. The cam 70 will rotate with the horizontal shaft 53 as a unit, and the construction and arrangement will be such that said cam will cause the latch releasing lever 71 to be swung upwardly to sufficient extent to cause the actuator arm 74 on said latch releasing lever to be lifted through a distance great enough to cause the latching lever 40 to be rotated through an arc of sufficient magnitude to release the keeper 43. The compression coil spring 33 will act immediately upon release of said keeper to elevate the actuator bar 28 and the rack supporting arm 21 from their positions as in Fig. 2 to their positions as in Fig. 3, and the gear and pinion will be moved apart and the switch 84—85 will be opened, in the manner as already set forth, in response to elevation of said actuator bar. Upon removal of the gear 54 from the pinion 60, the coil spring 56, tensioned by reason of being wound upon the horizontal shaft 53, will act to rotate said gear 54 back to its inoperative position as in Fig. 3, and, at the same time, the cam 70 will rotate back to its inoperative position to permit the latch releasing lever 71 to move by gravity back to its inoperative position, as in said Fig. 3. The motor and resistance element circuits will be open and the driving connection between the pinion 60 and the gear 54 will be broken when the actuator bar shall have reached its uppermost position, after the keeper 43 is released from the latching element 42, so that all of the parts of the operating mechanism of the device will be situated in their inoperative positions.

In Figs. 7 and 8 there is disclosed a modified type of instrumentality which can be employed to set the toaster selectively to produce light, medium and dark toast. As there shown, an actuator arm 101 is equivalent to the actuator arm 74, a latching lever 102 is equivalent to the latching lever 40, an upright 103 with flange portion 104 are equivalent to the upright 37 and the flange portion 39, respectively, and a pivotal support 105 for said latching lever 102 is equivalent to the pivotal support 41. The free end of the longer arm of the latching lever 102 adjustably supports a rack 106 adapted to be engaged by said actuator arm 101 when this is operative to release the latch. Said rack 106 is vertically disposed and is supported for vertical movement by a vertical strip 107 providing a guideway 108 in facing relation to a pinion 109 engaged with teeth on the rack. The pinion 109 is fixed upon a horizontal shank 110, equivalent to the horizontal shank 76, rotatably mounted in said latching lever 102. When light toast is desired, the horizontal shank 110 will be rotated to cause the pinion 109 to actuate the rack 106 to a lower operative position, when dark toast is desired, said horizontal shank will be rotated to cause said pinion to actuate said rack to an upper operative position, and when medium toast is desired, the horizontal shank will be rotated to cause the pinion to actuate the rack to an intermediate operative position. The horizontal shank 110 can be frictionally supported in the latching lever 102 to the accomplishment of the same purpose as is accomplished by frictionally supporting the horizontal shank 76 in the latching lever 40. As shown, however, the latching lever 102 supports a detent 111 for engagement between teeth of the pinion 109. The construction and arrangement will be such that the horizontal shank 110 can be manually rotated against tendency of the detent to retain the pinion 109 stationary, and also such that said detent will become engaged between teeth of said pinion upon cessation of its rotation thus to preclude possibility of rotation of the pinion when the rack 106 is lifted by the actuator arm 101.

In Figs. 9 and 10 there is disclosed mechanism which can be employed in the toaster as a substitute for mechanism of said toaster already described. As there shown, a horizontally disposed gear 115, equivalent to the vertically disposed gear 54, is fixed upon the upper end of a vertical shaft 116, equivalent to the horizontal shaft 53, and disposed in spaced, parallel relation to a horizontal plate 117, equivalent to the horizontal length 48, and said horizontally disposed gear 115 includes equally spaced gear teeth upon its circumference adapted to be engaged with and released from a pinion 118, equivalent to the pinion 60, in the manner as hereinbefore set forth. A latch releasing lever 119, equivalent to the latch releasing lever 71, is rotatably supported, as at 120, upon the horizontal plate 117 and rides a cam 121, equivalent to the cam upon the vertical shaft 116, and said latch releasing lever 119 integrally or rigidly supports an actuator arm 122, equivalent to the actuator arm 74. The latch releasing lever 119, together with the actuator arm 122 as a unit, will be forcibly swung outwardly in a horizontal plane in response to rotational movement of the cam 121 to cause said actuator arm 122 to engage a piece such as 75 eccentrically mounted on a longer arm, such as 44, of a latching lever, thus to accomplish lifting of said longer arm and release of a keeper such as 43. Elements disclosed in Figs. 9 and 10 and not described are the same as or equivalent to elements disclosed in Figs. 1 to 6 and hereinbefore described.

What is claimed is:

1. The combination with a member to be manually actuated from an inoperative to an operative position, a latching element for retaining said member in said operative position and a first resilient means for returning said member to said inoperative position upon its release by said latching element, of an electric motor, mechanism for releasing said latching element from said member including a pinion driven by said motor, a gear rotated by said pinion from a normal to an abnormal position, a cam fixed to rotate with said gear and a pivotally supported element engaged against said cam and operable upon said latching element, a circuit for said motor, a switch controlling said circuit, means operative in response to manual actuation of said member to close said switch and engage said gear with said pinion, means operative in response to actuation of said first resilient means to open said switch and release said gear from said pinion and a second resilient means operable to rotate said gear from said abnormal to said normal position upon its release from said pinion.

2. The combination as specified in claim 1 wherein said latching element is constituted as a first leg of a pivotally supported latching lever, and a member to be directly engaged by said pivotally supported element supported upon a second leg of said latching lever for adjustment toward and away from the pivotally supported element.

3. The combination with a member to be manually actuated from an inoperative to an operative position, a latching element for retaining said member in said operative position and a first resilient means for returning said member to said inoperative position upon its release by said latching element, of an electric motor, mechanism for releasing said latching element from said member including a pinion driven by said motor, a gear rotated by said pinion from a normal to an abnormal position, a cam fixed to rotate with said gear and a pivotally supported element engaged against said cam and operable upon said latching element, means operative in response to manual actuation of said member to engage said gear with said pinion, means operative in response to actuation of said first resilient means to release said gear from said pinion and a second resilient means operable to rotate said gear from said abnormal to said normal position upon its release from said pinion.

4. The combination as specified in claim 3 wherein said latching element is constituted as a first leg of a pivotally supported latching lever, and a member to be directly engaged by said pivotally supported element supported upon a second leg of said latching lever for adjustment toward and away from the pivotally supported element.

5. The combination with a member to be manually actuated from an inoperative to an operative position, a latching element for retaining said member in said operative position and a first resilient means for returning said member to said inoperative position upon its release from said latching element, of an electric motor, mechanism for releasing said latching element from said member including a pinion to be rotated in response to actuation of said motor, a gear to be rotated by said pinion from a normal to an abnormal position, means operable upon said latching element in response to rotation of said gear to release the latching element from said member, means operative in response to manual actuation of said member to engage said gear with said pinion, means operative in response to actuation of said first resilient means to release said gear from said pinion and a second resilient means operable to rotate said gear from said abnormal to said normal position upon its release from said pinion.

6. The combination as specified in claim 5 wherein said latching element is constituted as a first leg of a pivotally supported latching lever, and a member to be engaged by said means operable upon the latching element adjustably supported upon a second leg of said latching lever.

7. The combination as specified in claim 5, a circuit for said motor, and a switch controlling said circuit operable to closed position in response to manual actuation of said member and to open position in response to actuation of said first resilient means.

EDWARD C. STANTON.

REFERENCES CITED

The following references are of record in the file of this patent:

UNITED STATES PATENTS

| Number | Name | Date |
| --- | --- | --- |
| 2,163,419 | Warren | June 20, 1939 |
| 2,308,037 | Abadjieff | Jan. 12, 1943 |